United States Patent
Kodama et al.

(10) Patent No.: US 10,883,031 B2
(45) Date of Patent: Jan. 5, 2021

(54) AUTOMOTIVE ENGINE COOLANT COMPOSITION, AUTOMOTIVE ENGINE CONCENTRATED COOLANT COMPOSITION, AND METHOD OF OPERATING INTERNAL COMBUSTION ENGINE

(71) Applicant: TOYOTA JIDOSHA KABUSHIKI KAISHA, Toyota (JP)

(72) Inventors: Yasuaki Kodama, Toyota (JP); Kazuhito Yaeda, Shizuoka (JP); Yoichiro Yoshii, Shizuoka (JP); Yosuke Kishino, Shizuoka (JP); Tomoyuki Nakano, Shizuoka (JP); Masayuki Nagasawa, Shizuoka (JP); Shogo Kamenoue, Wakayama (JP)

(73) Assignee: TOYOTA JIDOSHA KABUSHIKI KAISHA, Toyota ( * ) Notice: Subject to any disclaimer, the term of this patent is extended or adjusted under 35 U.S.C. 154(b) by 0 days.

(21) Appl. No.: 16/311,986

(22) PCT Filed: Jun. 20, 2017

(86) PCT No.: PCT/IB2017/000749
§ 371 (c)(1),
(2) Date: Dec. 20, 2018

(87) PCT Pub. No.: WO2017/221060
PCT Pub. Date: Dec. 28, 2017

(65) Prior Publication Data
US 2019/0194516 A1    Jun. 27, 2019

(30) Foreign Application Priority Data
Jun. 24, 2016    (JP) .................. 2016-125972

(51) Int. Cl.
*C09K 5/10*    (2006.01)
*C09K 5/20*    (2006.01)

(52) U.S. Cl.
CPC . *C09K 5/10* (2013.01); *C09K 5/20* (2013.01)

(58) Field of Classification Search
CPC .................. C09K 5/10; C09K 5/20
(Continued)

(56) References Cited

U.S. PATENT DOCUMENTS

| 4,610,222 A * | 9/1986 | Goddard | C09K 5/20 |
| | | | 123/41.42 |
| 7,001,531 B2 * | 2/2006 | Chen | F01P 11/0204 |
| | | | 252/71 |

(Continued)

FOREIGN PATENT DOCUMENTS

| CN | 1720311 A | 1/2006 |
| CN | 102108288 A | 6/2011 |

(Continued)

*Primary Examiner* — Jane L Stanley
(74) *Attorney, Agent, or Firm* — Sughrue Mion, PLLC

(57) ABSTRACT

An automotive engine coolant composition includes: a surfactant as a viscosity index improver; a rubber swelling inhibitor; and a base, in which the rubber swelling inhibitor is at least one selected from a compound expressed by a following formula (1) [in the formula, $R^1$ is hydrogen, a methyl group, or an ethyl group] and a compound expressed by a following formula (2) [in the formula, $R^2$ is hydrogen, a methyl group, or an ethyl group], the base includes at least one alcohol selected from the group consisting of a monohydric alcohol, a dihydric alcohol, a trihydric alcohol, and a glycol monoalkyl ether and/or water, a kinematic viscosity is 8.5 mm²/s or more at 25° C., and a content of the rubber swelling inhibitor is 0.03 parts by mass or more and 0.9 parts by mass or less with respect to 100 parts by mass of the coolant composition.

(1)

(Continued)

-continued

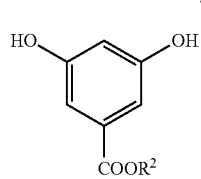
(2)

10 Claims, 1 Drawing Sheet (58) Field of Classification Search
USPC .......................................................... 252/73
See application file for complete search history.

(56) References Cited

U.S. PATENT DOCUMENTS 7,387,748 B2 * 6/2008 Pellet .................... C09K 5/20
252/73

2004/0069342 A1 * 4/2004 Hellsten .............. B01F 17/0042
137/13
2007/0200088 A1 * 8/2007 Wehner .................... A61Q 5/02
252/73
2015/0211407 A1 7/2015 Hirai et al.

FOREIGN PATENT DOCUMENTS

| | | |
|---|---|---|
| CN | 104011344 A | 8/2014 |
| GB | 961409 A | 6/1964 |
| JP | 02-051988 B2 | 11/1990 |
| JP | 2009-242663 A | 10/2009 |
| JP | 2015-074669 A | 4/2015 |
| JP | 5904278 B2 | 3/2016 |
| JP | 2016-124931 A | 7/2016 |
| JP | 2017-132923 A | 8/2017 |
| RU | 2196797 C1 | 1/2003 |
| WO | 2004/050785 A2 | 6/2004 |
| WO | 2005/054398 A1 | 6/2005 |
| WO | 2016/103027 A1 | 6/2016 |

* cited by examiner

COOLANT

HYDROPHOBIC GROUP

SURFACTANT

HYDROPHILIC GROUP

RUBBER

FIG. 1D

AUTOMOTIVE ENGINE COOLANT COMPOSITION, AUTOMOTIVE ENGINE CONCENTRATED COOLANT COMPOSITION, AND METHOD OF OPERATING INTERNAL COMBUSTION ENGINE

CROSS-REFERENCE TO RELATED APPLICATIONS

This application is a § 371 of International Application No. PCT/IB2017/000749 filed Jun. 20, 2017 which claims priority from Japanese Patent Application No. 2016-125972 filed Jun. 24, 2016.

BACKGROUND OF THE INVENTION

1. Field of the Invention

The present invention relates to an automotive engine coolant composition, an automotive engine concentrated coolant composition, and a method of operating an internal combustion engine.

2. Description of Related Art

Various types of coolant for cooling automotive engines and the like are known, and among the coolants, water has been widely used as engine coolant because of its highest cooling performance. However, so-called pure water, which does not contain an electrolyte and the like, freezes at 0° C. or lower, and increases in volume, possibly leading to damage to the engine and radiator. Therefore, a coolant composition, which does not use only pure water, and is formed by using a glycol such as ethylene glycol as the base for the purpose of antifreeze properties, diluting this with water so as to obtain a required freezing temperature, and mixing various additives for protecting metals, rubbers, resins, and the like used in the engine or radiator from deterioration as necessary therein has been used.

However, in a case where glycols such as ethylene glycol are used, there is a possibility that the viscosity of the coolant composition may significantly increase particularly at a low temperature. Therefore, in order to adjust the viscosity of the coolant, a viscosity index improver is mixed therein (Japanese Patent No. 5904278), and a technique for prompting quick warm-up of the engine and improving fuel efficiency by mixing a surfactant as a viscosity index improver in a coolant and thus appropriately increasing viscosity has been carried out. On the other hand, since the surfactant has the drawback of swelling the rubber used in automotive parts, an antioxidant has been blended in order to suppress the volume change of the rubber under the immersion environment in the coolant.

For example, in Japanese Patent Application Publication No. 2009-242663 (JP 2009-242663 A), it is described that a sulfur-containing alcohol or a phenol-based antioxidant is mixed in a rubber swelling antifreeze/coolant composition containing an aliphatic monobasic acid. In WO2004/050785, it is described that hydroxybenzoic acid, isocitric acid, acetylsalicylic acid, and the like are mixed as additives for improving the thermal stability of glycol components. In WO2005/054398, it is described that by mixing gallic acid, derivatives of gallic acid, or catechols in a coolant composition containing a glycol as a primary component and an aliphatic carboxylic acid or an aromatic carboxylic acid, blackening of aluminum or aluminum alloys is prevented. In GB961409, it is described that a hydroxy compound (catechol) as an antioxidant is mixed in a coolant. In Japanese Patent Publication No. 2-51988, it is described that resorcinol, fluoroglycine, and the like are mixed in a coolant for calcium chloride brine.

However, the coolant mixed with the antioxidant as described above has a possibility that there may be insufficient effect in suppressing swelling of rubber or the coolant may be significantly discolored.

SUMMARY OF THE INVENTION

The present invention provides an automotive engine coolant composition which has a specific kinematic viscosity and is capable of suppressing swelling of contacting rubber and discoloration of a coolant. The present invention also provides an automotive engine concentrated coolant composition for obtaining such an automotive engine coolant composition.

As a result of intensive studies to solve the above problems, the inventors completed the present invention by combining a coolant composition containing a surfactant and a base with a specific rubber swelling inhibitor in a specific amount.

That is, the present invention includes the following inventions.

[1] An automotive engine coolant composition including: a surfactant as a viscosity index improver; a rubber swelling inhibitor; and a base, in which
the rubber swelling inhibitor is at least one selected from a compound expressed by a following formula (1):

[In the formula, $R^1$ is hydrogen, a methyl group, or an ethyl group], and a compound expressed by a following formula (2):

[in the formula, $R^2$ is hydrogen, a methyl group, or an ethyl group], the base includes at least one alcohol selected from the group consisting of a monohydric alcohol, a dihydric alcohol, a trihydric alcohol, and a glycol monoalkyl ether and/or water, and a kinematic viscosity is 8.5 mm²/s or more at 25° C., and a content of the rubber swelling inhibitor is 0.03 parts by mass or more and 0.9 parts by mass or less with respect to 100 parts by mass of the coolant composition.

[2] The coolant composition according to [1], in which the coolant composition may have a kinematic viscosity of 2.0 mm²/s or less at 100° C.

[3] The coolant composition according to [1] or [2], in which the content of the rubber swelling inhibitor may be 0.05 parts by mass or more and 0.5 parts by mass or less with respect to 100 parts by mass of the coolant composition.

[4] The coolant composition according to any one of [1] to [3], a content of the surfactant may be 0.005 parts by mass or more and 3 parts by mass or less with respect to 100 parts by mass of the coolant composition.

[5] The coolant composition according to any one of [1] to [4], which may further include a rust inhibitor.

[6] The coolant composition according to any one of [1] to [5], in which the base may contain an organic solvent.

[7] An automotive engine concentrated coolant composition for obtaining the coolant composition according to any one of [1] to [6], which is diluted 2 to 10 times by mass with a base so as to be used.

[8] The concentrated coolant composition according to [7], in which, with respect to 100 parts by mass of the concentrated coolant composition, a surfactant as a viscosity index improver: 0.1 to 99 parts by mass; a rubber swelling inhibitor: 0.1 to 5 parts by mass; and a solvent: 0 to 99.8 parts by mass may be contained.

[9] A method of operating an internal combustion engine, which uses the coolant composition according to any one of [1] to [6] as a coolant.

The automotive engine coolant composition of the present invention has a specific kinematic viscosity and thus can improve the fuel efficiency effect of an internal combustion engine. In addition, the automotive engine coolant composition of the present invention can suppress swelling of rubber used in automotive parts while suppressing discoloration of the coolant. In addition, the automotive engine coolant composition can be obtained by diluting the automotive engine concentrated coolant composition of the present invention.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

An automotive engine coolant composition of the present invention (hereinafter, also referred to as a coolant composition of the present invention) includes a surfactant (A) as a viscosity index improver, a specific rubber swelling inhibitor (B), and a base (C). The inventors found that by combining a coolant composition containing a surfactant as a viscosity index improver and a base with a specific rubber swelling inhibitor, a specific kinematic viscosity is imparted due to an appropriate thickening effect exhibited by the surfactant, and it becomes possible to suppress swelling of contacting rubber and discoloration of the coolant. A coolant mixed with an antioxidant of the related art, particularly a phenolic antioxidant is not effective enough to suppress swelling of rubber and causes significant discoloration. However, the coolant composition of the present invention mixed with the specific rubber swelling inhibitor (B) is excellent both in suppression of swelling of rubber and suppression of discoloration. Although the details of mechanisms for causing the specific kinematic viscosity to be exhibited due to an appropriate thickening effect of the viscosity index improver according to the present invention are not clear, the following is conceivable. That is, it is conceivable that as the viscosity index improver is present in a coolant, a complex with the base is formed, a certain type of structure is formed in the coolant, and the structure can be changed by a change in temperature, so that the viscosity characteristics of the coolant can be adjusted. However, it should not be construed as being limited to the mechanisms.

Figure 1A:
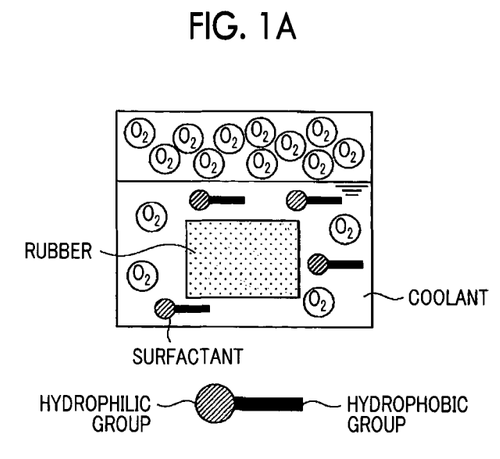
FIG. 1A is a diagram showing a putative mechanism for swelling of rubber.
Figure 1B:
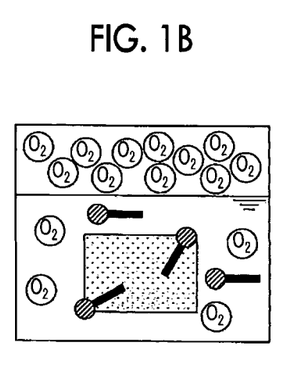
FIG. 1B is a diagram showing a putative mechanism for swelling of rubber.
Figure 1C:
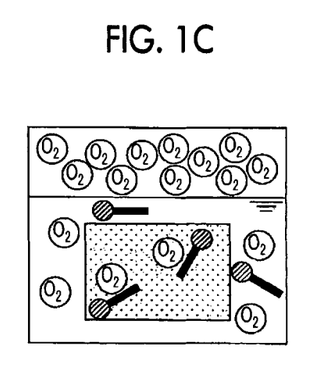
FIG. 1C is a diagram showing a putative mechanism for swelling of rubber.
Figure 1D:
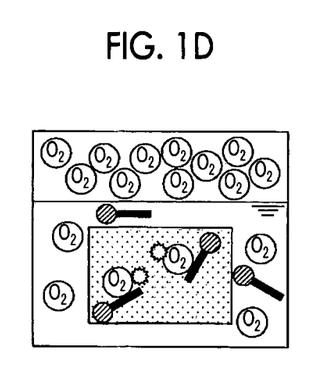
FIG. 1D is a diagram showing a putative mechanism for swelling of rubber.
Figure 1E:
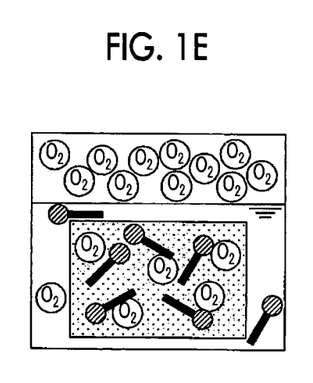
FIG. 1E is a diagram showing a putative mechanism for swelling of rubber.

Although not restrained by theory, it is conceivable that in the coolant composition of the present invention, the rubber swelling inhibitor (B) suppresses oxidation deterioration due to oxygen brought into rubber by the surfactant such that it becomes possible to suppress swelling of rubber. A putative mechanism for swelling of rubber in a coolant mixed with a surfactant is illustrated in FIGS. 1A to 1E. First, a hydrophobic group of the surfactant as a viscosity index improver penetrates into the rubber contacting the coolant (FIGS. 1A and 1B), and a hydrophilic group of the surfactant brings the coolant in which oxygen is dissolved into the rubber such that the rubber is swelled (FIG. 1C). Oxygen brought into the rubber oxidizes and deteriorates the rubber and the cross-link density of the rubber decreases due to breaking of the molecular chain and introduction of oxygen atoms into the molecule (FIG. 1D). The surfactant and the coolant in which oxygen is dissolved are further brought into and penetrate into the dense rubber surface layer, and the rubber is swelled (FIG. 1E). The penetrated oxygen further oxidized and deteriorated the rubber, and the surfactant further brings the coolant in which oxygen is dissolved into the rubber, resulting in an increase in the swelling of the rubber (FIG. 1E).

In this specification, the term "rubber" refers to those that are in contact with an automotive engine coolant, such as an automotive engine, an inverter, a battery, and hoses. Specific examples thereof include ethylene propylene diene rubber (EPDM), hydrogenated nitrile rubber (H-NBR), nitrile rubber (NBR), fluoro rubber (FKM), and silicone rubber (VMQ). The coolant composition of the present invention has a structure such as a carbon-hydrogen bond in the polymer backbone chain of the rubber molecule, and oxygen is incorporated by the surfactant. Therefore, the coolant composition exhibits particularly desirable effects on rubber in which breaking of the molecular chain and introduction of oxygen atoms into the molecule easily occur.

In this specification, a "low temperature" means, for example, 25° C. and a "high temperature" means, for example, 100° C.

The surfactant (A) used in the coolant composition of the present invention can be typically used as a viscosity index improver in the coolant composition and is not particularly limited as long as the effects of the present invention can be obtained. The surfactant (A) may be any of a nonionic surfactant, an anionic surfactant, a cationic surfactant, and an amphoteric surfactant. One type of the surfactant (A) may be used singly, or two or more types thereof may be used in combination.

Specific examples of the nonionic surfactant include a compound having a polyalkylene glycol chain, an ester of a fatty acid with a polyhydric alcohol such as glycerin, sorbitol, or sucrose, a fatty acid alkanolamide, and the like. From the viewpoint of heat resistance and water solubility, a compound having a polyalkylene glycol chain is preferable, and a compound having a polyethylene glycol chain is more preferable. Examples of the compound having a polyethylene glycol chain include polyoxyethylene polyoxypropylene glycol, polyoxyethylene monoalkyl ether, polyoxyethylene dialkyl ether, polyoxyethylene polyoxypropylene alkyl ether, polyoxyethylene alkyl phenyl ether, polyethylene glycol polyhydric alcohol ether, polyethylene glycol alkyl amino ether, polyethylene glycol mono fatty acid ester, polyethylene glycol difatty acid ester, polyoxyethylene sorbitan fatty acid ester, polyoxyethylene sorbitol fatty acid ester, polyoxyethylene glycerin fatty acid ester, polyoxyethylene castor oil, polyoxyethylene hydrogenated castor oil, and polyoxyethylene fatty acid amide. Among these, polyoxyethylene monoalkyl ether, fatty acid alkanol amide, polyethylene glycol difatty acid ester, and polyoxyethylene fatty acid amide, which greatly increase in kinematic viscosity at 25° C. and slightly increase in kinematic viscosity at 100° C. in a low mixing amount, are preferable, and polyoxyethylene monoalkyl ether is more preferable.

The polyoxyalkylene alkyl ether is preferably a compound represented by the following formula (3):

$$R^aO—(R^bO)_p—H \quad (3)$$

[in the formula, $R^a$ is a linear or branched alkyl or alkenyl group having 12 or more and 24 or less carbon atoms, $R^b$ is an ethylene group or a propylene group, p represents an average number of moles of $R^bO$ added, and is a number from 0.5 or more and 20 or less.]

Regarding $R^a$ mentioned above, the alkyl group or alkenyl group may be linear or branched, and is preferably linear from the viewpoint of thickening effect. The number of carbon atoms of the alkyl group or alkenyl group is preferably 12 or more and 24 or less, more preferably 16 or more and 22 or less, and even more preferably 20 or more and 22 or less.

Specific examples thereof include: an alkyl group such as a lauryl group, a myristyl group, a cetyl group, a margaryl group, an isostearyl group, a 2-heptylundecyl group, a stearyl group, an arachidyl group, a behenyl group, and a lignoceryl group; and an alkenyl group such as an oleyl group. A cetyl group, a stearyl group, and a behenyl group are preferable, and a stearyl group and a behenyl group are more preferable.

$R^b$ mentioned above is preferably an ethylene group or a propylene group, and is more preferably an ethylene group from the viewpoint of thickening effect.

p mentioned above represents the average number of moles of $R^bO$ added, and from the viewpoint of thickening effect, is preferably a number from 0.5 or more and 20 or less, more preferably a number from 1 or more and 15 or less, even more preferably a number from 2 or more and 11 or less, and even more preferably a number from 3 or more and 8 or less.

Examples of the anionic surfactant include an alkyl sulfuric acid ester salt, a polyoxyethylene alkyl ether sulfuric acid ester salt, an alkylbenzene sulfonic acid salt, a fatty acid salt, an alkyl phosphoric acid ester salt, and a polyoxyethylene alkyl ether phosphoric acid ester salt. A polyoxyethylene alkyl ether sulfuric acid ester salt, which greatly increases in kinematic viscosity at 25° C. and slightly increases in kinematic viscosity at 100° C. in a low mixing amount, is preferable.

The polyoxyethylene alkyl ether sulfuric acid ester salt is preferably a compound represented by the following formula (4):

$$R^cO—(R^dO)_q—SO_3M \quad (4)$$

[in the formula, $R^c$ is a linear or branched alkyl or alkenyl group having 16 or more and 24 or less carbon atoms, $R^d$ is an ethylene group or a propylene group, q represents an average number of moles of $R^dO$ added, and is a number from 0.5 or more and 10 or less, and M is a cation or a hydrogen atom.]

Regarding $R^c$ mentioned above, the alkyl group may be linear or branched, and is preferably linear from the viewpoint of thickening effect. The number of carbon atoms of the alkyl group and the alkenyl group is preferably 16 or more and 24 or less, more preferably 18 or more and 22 or less, and even more preferably 20 or more and 22 or less.

Specific examples thereof include: an alkyl group such as a cetyl group, a margaryl group, an isostearyl group, a 2-heptylundecyl group, a stearyl group, an arachidyl group, a behenyl group, a lignoceryl group; and an alkenyl group such as an oleyl group. A cetyl group, a stearyl group, an arachidyl group, and a behenyl group are preferable, and a behenyl group is more preferable.

$R^d$ mentioned above is preferably an ethylene group or a propylene group, and is more preferably an ethylene group from the viewpoint of thickening effect.

q mentioned above represents the average number of moles of $R^dO$ added, and from the viewpoint of having a specific kinematic viscosity at a low temperature and a high temperature, is preferably a number from 0.5 or more and 10 or less, and more preferably a number from 1 or more and 8 or less, even more preferably a number from 2 or more and 7 or less, and even more preferably a number from 3 or more and 6 or less.

M mentioned above is a cation or a hydrogen atom, and is preferably a cation. Specific examples of the cation include an alkali metal ion and an ammonium ion, and examples of the alkali metal include lithium, sodium, and potassium. Sodium or potassium is preferable.

Examples of the cationic surfactant include an alkylamine salt and a quaternary ammonium salt.

Examples of the amphoteric surfactant include an alkylbetaine and an alkylamine oxide.

The surfactant (A) used in the coolant composition of the present invention can be typically used as a viscosity index improver in the coolant composition and is not particularly limited as long as the effects of the present invention can be obtained. From the viewpoint of thickening effect, a nonionic surfactant or an anionic surfactant is preferable, and an anionic surfactant is more preferable.

The coolant composition of the present invention may contain an alkali metal compound (A'). In a case where the surfactant (A) used is an anionic surfactant, particularly an anionic surfactant represented by the formula (4), the alkali metal compound (A') is preferably contained.

The alkali metal compound (A') is at least one type selected from the group consisting of an alkali metal salt and an alkali metal hydroxide, and the alkali metal salt excludes the surfactant (A). Examples of the alkali metal include sodium, potassium, and lithium. Examples of the alkali metal salt include an alkali metal salt of an inorganic acid or an organic acid, and an alkali metal salt of a triazole or a thiazole. Examples of the alkali metal salt of an inorganic acid include an alkali metal salt of nitrous acid such as sodium nitrite and potassium nitrite; an alkali metal salt of nitric acid such as sodium nitrate and potassium nitrate; an alkali metal salt of molybdic acid such as sodium molybdate and potassium molybdate; an alkali metal salt of hypochlorous acid such as sodium hypochlorite and potassium hypochlorite; an alkali metal salt of sulfuric acid such as sodium sulfate and potassium sulfate; an alkali metal salts of carbonic acid such as sodium carbonate and potassium carbonate; an alkali metal salt of hydrochloric acid such as sodium chloride and potassium chloride; an alkali metal salt of phosphoric acid such as sodium phosphate and potassium phosphate; an alkali metal salt of silicic acid such as sodium silicate and potassium silicate; and an alkali metal salt of boric acid such as sodium borate and potassium borate. Examples of the alkali metal salt of an organic acid include an alkali metal salt of an aromatic carboxylic acid such as benzoic acid, p-toluic acid, and p-tertbutylbenzoic acid; and an alkali metal salt of an aliphatic polyvalent carboxylic acid such as azelaic acid, sebacic acid, undecanedioic acid, dodecanedioic acid, and citric acid. Examples of the alkali metal salt of a triazole or a thiazole include an alkali metal salt of benzotriazole. Among the above-mentioned alkali metal salts, an alkali metal salt of an aliphatic polyvalent carboxylic acid is preferable from the viewpoint of causing the kinematic viscosity of the coolant composition at a low temperature and a high temperature to be in the predetermined range described above, and dipotassium sebacate is more preferable. In a case where an alkali metal salt is used as a rust inhibitor and/or a pH adjusting agent or the like, it is presumed that this is used as the alkali metal salt. In that case, an alkali metal compound does not necessarily need to be separately added.

The alkali metal hydroxide is not particularly limited, and specific examples thereof include lithium hydroxide, sodium hydroxide, and potassium hydroxide. Among the above-mentioned alkali metal hydroxides, potassium hydroxide is preferable from the viewpoint of causing the kinematic viscosity of the coolant composition at a low temperature and a high temperature to be in the predetermined range described above.

The content of the surfactant (A) in the coolant composition of the present invention is, with respect to the base described later (with respect to 100 g), preferably 0.01 mmol or more, more preferably 0.05 mmol or more, even more preferably 0.1 mmol or more, even more preferably 0.15 mmol or more, even more preferably 0.2 mmol or more, even more preferably 0.25 mmol or more, even more preferably 0.3 mmol or more, and even more preferably 0.4 mmol or more from the viewpoint of causing the kinematic viscosity of the coolant composition at a low temperature and a high temperature to be in the predetermined range described above, is preferably 3 mmol or less, more preferably 2 mmol or less, even more preferably 1 mmol or less, and even more preferably 0.8 mmol or less from the viewpoint of enhancing cooling properties and suppressing semi-solidification, and is preferably 0.01 mmol or more and 3 mmol or less, more preferably 0.05 mmol or more and 3 mmol or less, even more preferably 0.1 mmol or more and 2 mmol or less, even more preferably 0.2 mmol or more and 1 mmol or less, even more preferably 0.25 mmol or more and 0.8 mmol or less, even more preferably 0.3 mmol or more and 0.8 mmol or less, and even more preferably 0.4 mmol or more and 0.8 mmol or less from these viewpoints. In the case of using the rust inhibitor and/or the pH adjusting agent, the content of the surfactant (A) is preferably in the range described above with respect to the total amount of the base and the rust inhibitor and/or the pH adjusting agent (with respect to 100 g).

In addition, in another embodiment of the coolant composition of the present invention, the content of the surfactant (A) in 100 parts by mass of the coolant composition of the present invention is preferably 0.005 parts by mass or more, more preferably 0.01 parts by mass or more, even more preferably 0.05 parts by mass or more, even more preferably 0.08 parts by mass or more, even more preferably 0.1 parts by mass or more, and even more preferably 0.2 parts by mass or more from the viewpoint of causing the kinematic viscosity of the coolant composition at a low temperature and a high temperature to be in the predetermined range described above, is preferably 3 parts by mass or less, more preferably 1.8 parts by mass or less, even more preferably 1 part by mass or less, and even more preferably 0.6 parts by mass or less from the viewpoint of enhancing cooling properties and suppressing semisolidification, and is preferably 0.005 to 3 parts by mass, more preferably 0.01 to 1.8 parts by mass, even more preferably 0.08 to 1 parts by mass, even more preferably 0.1 to 0.6 parts by mass, and even more preferably 0.2 to 0.6 parts by mass from these viewpoints.

The content of the alkali metal compound (A') in the coolant composition of the present invention in combination with the surfactant (A) used is, with respect to the base described later (with respect to 100 g), preferably 0.5 mmol or more, more preferably 1.0 mmol or more, even more preferably 1.5 mmol or more, even more preferably 3 mmol or more, and even more preferably 5 mmol or more from the viewpoint of causing the kinematic viscosity of the coolant composition at a low temperature and a high temperature to be in the predetermined range described above, is preferably 90 mmol or less, more preferably 70 mmol or less, even more preferably 45 mmol or less, even more preferably 20 mmol or less, and even more preferably 15 mmol or less from the viewpoint of enhancing cooling properties and suppressing precipitation, and is preferably 0.5 mmol or more and 90 mmol or less, more preferably 1 mmol or more and 90 mmol or less, even more preferably 1 mmol or more and 70 mmol or less, even more preferably 1 mmol or more and 45 mmol or less, even more preferably 1.5 mmol or more and 20 mmol or less, even more preferably 3 mmol or more and 20 mmol or less, and even more preferably 5 mmol or more and 15 mmol or less from these viewpoints. In the case of using the rust inhibitor and/or the pH adjusting agent, the content of the alkali metal compound is preferably in the range described above with respect to the total amount of the base and the rust inhibitor and/or the pH adjusting agent (with respect to 100 g). In addition, in the case of using the rust inhibitor and/or the pH adjusting agent, the number of moles of the alkali metal compound is calculated by including the rust inhibitor and/or the pH adjusting agent as the alkali metal compound.

In a case of being used together with $C_{22}H_{45}O$—$(CH_2CH_2O)_4$—$SO_3Na$ or $C_{22}H_{45}O$—$(CH_2CH_2O)_4$—$SO_3K$ as the surfactant (A), the content of the alkali metal compound (A') is, with respect to the base described above (with respect to 100 g), preferably 1.0 mmol or more and 90 mmol or less, and more preferably 1.0 mmol or more and 45 mmol or less. In a case where both an alkali metal salt and an alkali metal hydroxide are used, the content of the alkali metal compound is the total number of moles thereof. In the case of using an alkali metal compound as the rust inhibitor and/or the pH adjusting agent, the number of moles of the alkali metal compound is calculated by including the rust inhibitor and/or the pH adjusting agent as the alkali metal compound.

The content of the alkali metal compound (A') in the coolant composition of the present invention in 100 parts by mass of the coolant composition of the present invention in combination with the surfactant (A) used is preferably 0.01 parts by mass or more, more preferably 0.02 parts by mass or more, even more preferably 0.03 parts by mass or more, even more preferably 0.05 parts by mass or more, even more preferably 0.1 parts by mass or more, even more preferably 0.25 parts by mass or more, even more preferably 0.5 parts by mass or more, and even more preferably 1 part by mass or more from the viewpoint of causing the kinematic viscosity of the coolant composition at a low temperature and a high temperature to be in the predetermined range described above, and is preferably 30 parts by mass or less, more preferably 21 parts by mass or less, even more preferably 20 parts by mass or less, even more preferably 10 parts by mass or less, even more preferably 7 parts by mass or less, and even more preferably 5 parts by mass or less from the viewpoint of enhancing cooling properties and suppressing precipitation. From these viewpoints, the content of the alkali metal compound is preferably 0.01 to 30 parts by mass, more preferably 0.01- to 20 parts by mass, even more preferably 0.02 to 10 parts by mass, even more preferably 0.03 to 10 parts by mass, even more preferably 0.05 to 7 parts by mass, even more preferably 0.1 to 7 parts by mass, even more preferably 0.5 to 7 parts by mass, even more preferably 1 to 7 parts by mass, and even more preferably 1 to 5 parts by mass. In the case of using an alkali metal compound as the rust inhibitor and/or the pH adjusting agent, the content of the alkali metal compound is calculated by including the rust inhibitor and/or the pH adjusting agent as the alkali metal compound.

In the coolant composition of the present invention, the molar ratio (alkali metal ions/surfactant) of the alkali metal ions to the surfactant (A) is preferably 1.5 or more, preferably 2.5 or more, even more preferably 3 or more, even more preferably 5 or more, even more preferably 10 or more, even more preferably 20 or more, even more preferably 30 or more, and even more preferably 40 or more from the viewpoint of causing the kinematic viscosity of the coolant composition at a low temperature and a high temperature to be in the predetermined range described above, is preferably 3000 or less, more preferably 2500 or less, even more preferably 2000 or less, even more preferably 1500 or less, even more preferably 1100 or less, even more preferably 1000 or less, even more preferably 700 or less, even more preferably 500 or less, even more preferably 300 or less, even more preferably 200 or less, and even more preferably 100 or less from the same viewpoint, and is preferably 1.5 or more and 3000 or less, more preferably 2.5 or more and 3000 or less, even more preferably 3 or more and 2500 or less, even more preferably 5 or more and 2000 or less, even more preferably 5 or more and 1500 or less, even more preferably 10 or more and 1000 or less, even more preferably 10 or more and 700 or less, even more preferably 20 or more and 500 or less, even more preferably 30 or more and 300 or less, even more preferably 30 or more and 200 or less, even more preferably 30 or more and 100 or less, and even more preferably 40 or more and 100 or less from these viewpoints.

The number of moles of the alkali metal ions is, in a case where there are a plurality of types of alkali metals, the total number of moles of the alkali metals. Alkali metal ions mean ions of all alkali metals in the coolant, contain not only alkali metal ions derived from the alkali metal compound but also alkali metal ions derived from the surfactant and alkali metal ions derived from other arbitrary components such as the rust inhibitor and the pH adjusting agent. In addition, in a case where the surfactant is a mixture, the number of moles of the surfactant is the total number of moles of the components of the mixture.

The coolant composition of the present invention contains the specific rubber swelling inhibitor (B). The rubber swelling inhibitor (B) is at least one selected from a compound expressed by the following formula (1):

(1)

[In the formula, $R^1$ is hydrogen, a methyl group, or an ethyl group], and a compound expressed by the following formula (2):

(2)

[in the formula, $R^2$ is hydrogen, a methyl group, or an ethyl group].

Although the coolant composition of the present invention contains the surfactant (A) as the viscosity index improver, the coolant composition can suppress swelling of rubber and discoloration of the coolant by including the rubber swelling inhibitor.

The action of the compound expressed by the formula (1) or (2) on rubber is not restrained by theory. However, it is conceivable that oxidation deterioration of rubber is a radical chain reaction, rubber molecules as radicals react with themselves such that the rubber molecules are reduced. In the compound expressed by the formula (1), $R^1$ is preferably a methyl group or an ethyl group from the viewpoint of solubility. In the compound expressed by the formula (2), $R^2$ is preferably a methyl group or an ethyl group from the viewpoint of solubility.

The content of the rubber swelling inhibitor (B) in the coolant composition of the present invention in 100 parts by mass of the coolant composition of the present invention in combination with the surfactant (A) used is 0.03 parts by mass or more, preferably 0.05 parts by mass or more, more preferably 0.1 parts by mass or more, even more preferably 0.15 parts by mass or more, and even more preferably 0.2 parts by mass or more from the viewpoint of suppressing swelling of rubber, is 0.9 parts by mass or less, preferably 0.5 parts by mass or less, more preferably 0.45 parts by mass or less, even more preferably 0.4 parts by mass or less, and even more preferably 0.35 parts by mass or less from the viewpoint of suppressing discoloration of the coolant, and is 0.03 parts by mass or more and 0.9 parts by mass or less, preferably 0.05 parts by mass or more and 0.5 parts by mass or less, more preferably 0.1 parts by mass or more and 0.45 parts by mass or less, even more preferably 0.15 parts by mass or more and 0.4 parts by mass or less, and even more preferably 0.2 parts by mass or more and 0.35 parts by mass or less from these viewpoints. In a case of using the compound expressed by the formula (1) and/or (2) as other additives such as a rust inhibitor, which will be described later, the content of the rubber swelling inhibitor is calculated by including the other additives as the rubber swelling inhibitor.

The content of the rubber swelling inhibitor (B) in the coolant composition of the present invention in combination with the surfactant (A) used is, with respect to the base described below (with respect to 100 g), preferably 0.3 mmol or more, more preferably 0.6 mmol or more, even more preferably 0.8 mmol or more, and even more preferably 1.1 mmol or more from the viewpoint of suppressing swelling of rubber, is preferably 4.0 mmol or less, more preferably 3.6 mmol or less, even more preferably 3.2 mmol or less, and even more preferably 2.8 mmol or less from the viewpoint of suppressing discoloration of the coolant, and is preferably 0.3 mmol or more and 4.0 mmol or less, more preferably 0.6 mmol or more and 3.6 mmol or less, even more preferably 0.8 mmol or more and 3.2 mmol or less, and even more preferably 1.1 mmol or more and 2.8 mmol or less from these viewpoints. In the case of using the rust inhibitor and/or the pH adjusting agent, the content of the rubber swelling inhibitor is preferably in the range described above with respect to the total amount of the base and the rust inhibitor and/or the pH adjusting agent (with respect to 100 g). In the case of using the compound expressed by the formula (1) and/or (2) as other additives such as the rust inhibitor, which will be described later, the number of moles of the rubber swelling inhibitor is calculated by including the other additives as the rubber swelling inhibitor.

In a case of being used together with $C_{22}H_{45}O-(CH_2CH_2O)_4-SO_3Na$ or $C_{22}H_{45}O-(CH_2CH_2O)_4-SO_3K$ as the surfactant (A), the content of the rubber swelling inhibitor (B) is, with respect to the base described below (with respect to 100 g), preferably 0.8 mmol or more and 3.2 mmol or less, and more preferably 1.1 mmol or more and 2.8 mmol or less. In the case of using the compound expressed by the formula (1) and/or (2) as other additives such as the rust inhibitor, which will be described later, the number of moles of the rubber swelling inhibitor is calculated by including the other additives as the rubber swelling inhibitor.

In the coolant composition of the present invention, the molar ratio (rubber swelling inhibitor/surfactant) of the rubber swelling inhibitor (B) to the surfactant (A) is preferably 0.36 or more, more preferably 0.72 or more, even more preferably 0.96 or more, and even more preferably 1.3 or more from the viewpoint of suppressing swelling of rubber, is preferably 4.8 or less, more preferably 4.3 or less, even more preferably 3.8 or less, even more preferably 3.3 or less from the viewpoint of suppressing discoloration of the coolant, and is preferably 0.36 to 4.8, more preferably 0.72 to 4.3, even more preferably from 0.96 to 3.8, and even more preferably from 1.3 to 3.3 from these viewpoints. In the case of using the compound expressed by the formula (1) and/or (2) as other additives such as a rust inhibitor, which will be described later, the content of the rubber swelling inhibitor is calculated by including the other additives as the rubber swelling inhibitor.

The content of the rubber swelling inhibitor is, in a case where there are a plurality of types of compounds expressed by the formula (1) and/or compounds expressed by the formula (2), the total content of the compounds expressed by the formula (1) and/or the compounds expressed by the formula (2). In addition, the number of moles of the rubber swelling inhibitor is, in a case where there are a plurality of types of compounds expressed by the formula (1) and/or compounds expressed by the formula (2), the total number of moles of the compounds expressed by the formula (1) and/or the compounds expressed by the formula (2).

Examples of the base (C) used in the coolant composition of the present invention include water and an organic solvent, which can be used singly as water or an organic solvent, or as a mixture of water and an organic solvent. It is preferable to use a mixture of water and an organic solvent in consideration of antifreeze properties. In the coolant composition of the present invention, the base (C) is preferably contained as a primary component. Here, the "primary component" is a component that serves as the base of the coolant composition and indicates the most abundant component. If necessary, an additive or the like may be mixed in the base (C) for use in a range in which the effects of the present invention are not impaired. In this specification, the corresponding components contained in the coolant composition of the present invention are defined as other additives, which will be described later.

The organic solvent can be typically used in the coolant composition and is not particularly limited as long as the effects of the present invention can be obtained. An aqueous organic solvent is preferable, and examples thereof include at least one alcohol selected from the group consisting of a monohydric alcohol, a dihydric alcohol, a trihydric alcohol, and a glycol monoalkyl ether.

Examples of the monohydric alcohol include one or a mixture of two or more selected from methanol, ethanol, propanol, butanol, pentanol, hexanol, heptanol, and octanol.

Examples of the dihydric alcohol include one or a mixture of two or more selected from ethylene glycol, diethylene glycol, triethylene glycol, propylene glycol, 1,3-propanediol, 1,4-butanediol, 1,3-butanediol, 1,5-pentanediol, and hexylene glycol.

Examples of the trihydric alcohol include one or a mixture of two or more selected from glycerin, trimethylolethane, trimethylolpropane, 5-methyl-1,2,4-heptanetriol, and 1,2,6-hexanetriol.

Examples of the glycol monoalkyl ether include one or a mixture of two or more selected from ethylene glycol monomethyl ether, diethylene glycol monomethyl ether, triethylene glycol monomethyl ether, tetraethylene glycol monomethyl ether, ethylene glycol monoethyl ether, diethylene glycol monoethyl ether, triethylene glycol monoethyl ether, tetraethylene glycol monoethyl ether, ethylene glycol monobutyl ether, diethylene glycol monobutyl ether, triethylene glycol monobutyl ether, and tetraethylene glycol monobutyl ether.

Among the above-mentioned organic solvents, ethylene glycol, propylene glycol, and 1,3-propanediol are preferable from the viewpoint of handleability, costs, and ease of acquisition.

Therefore, the base (C) preferably contains one or more selected from the group consisting of ethylene glycol, propylene glycol, 1,3-propanediol, and water, and more preferably contains ethylene glycol and water. In addition, the base (C) is preferably composed of one or more selected from the group consisting of ethylene glycol, propylene glycol, 1,3-propanediol, and water, and is more preferably composed of ethylene glycol and water. Deionized water is preferable as the water used in the base.

In 100 parts by mass of the coolant composition of the present invention, the content of the base (C) is preferably 50 parts by mass or more, more preferably 75 parts by mass or more, even more preferably 80 parts by mass or more, and even more preferably 90 parts by mass or more from the viewpoint of functioning as a coolant, is preferably 99.92 parts by mass or less, more preferably 99.9 parts by mass or less, even more preferably 99.8 parts by mass or less, and even more preferably 99.7 parts by mass or less from the viewpoint of mixing the components of the coolant composition of the present invention, and is preferably 50 to 99.92 parts by mass, more preferably 80 to 99.9 parts by mass, even more preferably 90 to 99.9 parts by mass, even more preferably 90 to 99.8 parts by mass, and even more preferably 90 to 99.7 parts by mass from these viewpoints.

In a case where the base (C) contains water and alcohols, the mixing ratio between water and alcohols can be arbitrarily adjusted in consideration of antifreeze properties and inflammability. The mass ratio between water and alcohols in the base is preferably 20:80 to 90:10 (water:alcohols), and more preferably 40:60 to 75:25 from the viewpoint of avoiding generation of a flash point.

The kinematic viscosity at 25° C. of the coolant composition of the present invention is 8.5 mm$^2$/s or more from the viewpoint of suppressing cooling loss at a low temperature, and is preferably 3000 mm$^2$/s or less from the viewpoint of avoiding a load on a water pump and suppressing poor fuel efficiency of an internal combustion engine. From these viewpoints, the kinematic viscosity at 25° C. thereof is preferably 8.5 to 3000 mm$^2$/s, more preferably 9 to 2000 mm$^2$/s, and even more preferably 50 to 1000 mm$^2$/s.

From the viewpoint of maintaining the cooling capacity at a high temperature and preventing overheating, the kinematic viscosity at 100° C. of the coolant composition of the present invention is 2.0 mm$^2$/s or less, preferably 0.3 to 2.0 mm$^2$/s, and more preferably 0.4 to 1.8 mm$^2$/s. The cooling capacity of the coolant composition can be evaluated, for example, by measuring the thermal transmittance of a radiator. The kinematic viscosity at 100° C. of the coolant of 100% water is 0.3 mm$^2$/s.

In the coolant of the present invention, it is possible to set the kinematic viscosity to be in the predetermined range described above by including the components described above. In a case where it is desired to increase the kinematic viscosity at 25° C., this can be achieved by a method of increasing the content of the surfactant (A), a method of adjusting the content of the alkali metal compound (A') in a case of using the alkali metal compound (A'), a method of increasing the content of alcohols in a case where the base (C) contains the alcohols, and the like. In addition, in a case where it is desired to decrease the kinematic viscosity at 100° C., this can be achieved by a method of decreasing the content of the surfactant (A), a method of adjusting the content of the alkali metal compound (A') in a case of using the alkali metal compound (A'), a method of decreasing the content of alcohols in a case where the base (C) contains the alcohols, and the like.

If necessary, other additives than the components (A) to (C) described above may be mixed in the coolant composition of the present invention in a range in which the effects of the present invention are not impaired.

For example, in order to effectively suppress the corrosion of metals used in an engine coolant path, the coolant composition of the present invention may include at least one rust inhibitor in a range in which the effects of the present invention are not impaired. Examples of the rust inhibitor include any one or a mixture of two or more of phosphoric acid and/or a salt thereof, an aliphatic carboxylic acid and/or a salt thereof, an aromatic carboxylic acid and/or a salt thereof, a triazole, a thiazole, a silicate, a nitrate, a nitrite, a borate, a molybdate, and an amine salt.

For example, in order to prevent corrosion of metals, the coolant composition of the present invention may include at least one pH adjusting agent in a range in which the effects of the present invention are not impaired. Examples of the pH adjusting agent include any one or a mixture of two or more of sodium hydroxide, potassium hydroxide, and lithium hydroxide.

The pH at 25° C. of the coolant composition of the present invention is preferably 6 or more and more preferably 7 or more, and is preferably 10 or less and more preferably 9 or less.

To the coolant composition of the present invention, for example, a coloring agent, a dye, a dispersing agent, a bittering agent, or the like may be appropriately added in ranges in which the effects of the present invention are not impaired.

The total amount of the above-mentioned other additives mixed therein is typically 10 parts by mass or less and preferably 5 parts by mass or less with respect to 100 parts by mass of the composition.

In the present invention, a production method of the coolant composition is not particularly limited as long as the effects of the present invention can be obtained, and a typical production method of a coolant composition may be used. For example, the coolant composition can be produced through uniform stirring at a low temperature. The coolant composition of the present invention is more preferably obtained by, after mixing, heating the mixture to preferably 60° C. or higher, more preferably 80° C. or higher and preferably 100° C. or lower, stirring the resultant if necessary, dissolving the resultant, and thereafter cooling the resultant to room temperature (20° C.).

The present invention also relates to an automotive engine concentrated coolant composition (hereinafter, also referred to as concentrated coolant composition of the present invention). The concentrated coolant composition of the present invention is a composition containing the surfactant (A) as the viscosity index improver of the coolant composition of the present invention, the rubber swelling inhibitor (B), and a solvent (C') if necessary. The concentrated coolant composition of the present invention can be used for obtaining the coolant composition of the present invention by being diluted, for example, 2 to 10 times by mass with the base (C). The solvent (C') is a liquid that can be used in a typical coolant composition such as water and glycols, and as specific examples thereof, the above description regarding the base (C) is cited. In addition, the solvent (C') may be the same as or different from the base (C). The concentrated coolant composition of the present invention can suppress swelling of rubber after being diluted even in a case where the surfactant (A) as the viscosity index improver, the rubber swelling inhibitor (B), and the alkali metal compound (A') if necessary are concentrated beforehand. Therefore, the concentrated coolant composition can be used as the coolant composition by being diluted with the base (C) immediately before being supplied to the engine. In addition, other additives can be mixed in the concentrated coolant composition of the present invention in a range in which the effects of the present invention regarding the obtained coolant composition are not impaired. As the additives, the above description regarding the coolant composition of the present invention is cited. Furthermore, the additives may also be mixed in the solvent (C') for use.

An embodiment of the concentrated coolant composition of the present invention may include, with respect to 100 parts by mass of the concentrated coolant composition, the following components: (A) the surfactant as the viscosity index improver: 0.1 to 99 parts by mass; (B) the rubber swelling inhibitor: 0.1 to 5 parts by mass; and (C') the solvent: 0 to 99.8 parts by mass.

The concentrated coolant composition of the present invention may contain the alkali metal compound (A'). The content of the alkali metal compound (A') in the concentrated coolant composition of the present invention is, with respect to 100 parts by mass of the concentrated coolant composition, preferably 1 to 30 parts by mass, and more preferably 5 to 15 parts by mass.

The coolant composition of the present invention can be generally used as a coolant and is preferably used as a coolant for an internal combustion engine. Accordingly, the present invention also relates to a method of operating an internal combustion engine in which the coolant composition of the present invention is used as a coolant (hereinafter, also referred to as a method of operating an internal combustion engine of the present invention). According to the method of operating an internal combustion engine of the present invention, it is possible to greatly improve the fuel efficiency effect of the internal combustion engine. The coolant composition of the present invention can also be used as a coolant for a battery stack, a fuel cell stack, or the like.

Hereinafter, the present invention will be described in more detail using examples, but the present invention is not limited to these examples. In addition, numerical values in the formulation represent parts by mass.

[1. Preparation of LLC]

Materials of the formulation shown in Table 1 below were added, stirred, and mixed together, thereby producing an LLC. In Table 1, sebacic acid manufactured by Kokura Synthetic Industries, ltd. as a rust inhibitor, and caustic potash manufactured by Osaka Soda Co., Ltd. as a pH adjusting agent were used. The structure of a compound used as a rubber swelling inhibitor is shown below.

TABLE 1

| | LLC |
|---|---|
| Material | Mixing amount (parts by mass) |
| Ethylene glycol | 90.6 |
| Water | 1.2 |
| Rust inhibitor | 4.2 |
| pH adjusting agent | 4 |

Examples 1 to 6 and Comparative Examples 1 to 11

A rubber swelling inhibitor described in Tables 2-1 and 2-2 below, a polyoxyethylene alkyl ether sulfuric acid ester salt ($R^c$ in formula (4) is a linear alkyl group having 22 carbon atoms, $R^d$ is ethylene group, q is 4, and M is sodium) as a surfactant (A) (viscosity index improver), and water were mixed in the LLC at mixing amounts (parts by mass) described in Tables 2-1 and 2-2 so that the total amount thereof reached 100 parts by mass, thereby producing coolant compositions of Examples 1 to 6 and coolant compositions of Comparative Examples 1 to 11. There, the polyoxyethylene alkyl ether sulfuric acid ester salt was synthesized as follows.

<Synthesis Method of Polyoxyethylene Alkyl Ether Sulfuric Acid Ester Salt>

Using a thin-film sulfation reactor having an outer jacket, an alcohol ethoxylate (the average number of moles of ethylene oxide added was 4.0) of a higher alcohol primarily containing 22 carbon atoms (trade name: KALCOL 220-80 manufactured by Kao corporation) was caused to flow down in a thin film form at a supply rate of 5.0 L/h, and sulfur trioxide gas diluted with dry air (concentration of sulfur trioxide gas: 1.1 vol %) was added under conditions of a reactor cooling temperature of 40° C. and a supply rate of 130 L/min (molar ratio of sulfur trioxide/ethoxylate:1.00) to carry out a sulfation reaction.

The obtained polyoxyethylene alkyl ether sulfate was neutralized by a 2.5% sodium hydroxide aqueous solution (molar ratio of sodium hydroxide/polyoxyethylene alkyl ether sulfuric acid ester: 1.10) so as to cause the concentration of polyoxyethylene ether sodium sulfate to be 23% or more and 27% or less such that polyoxyethylene alkyl ether sodium sulfate having 22 carbon atoms (the average number of moles of ethylene oxide added was 4.0) was synthesized.

<Evaluation Tests>

The obtained coolant compositions were subjected to the following evaluation tests.

<1. Test of Effect on Viscosity Index>

The kinematic viscosity at 25° C. was measured according to JIS K 2283. A case where the kinematic viscosity at 25° C. of the coolant composition was 8.5 mm²/s or higher was evaluated as good.

<2. Measurement of Rate of Change in Rubber Volume>

The temperature of the coolant was set to 120° C., a test piece of H-NBR rubber was immersed under an oxygen pressure of 0.1 MPa for 1000 hours, and the rate of change in the volume of the test piece after immersion was measured. A rate of change in the volume of 30% or less was evaluated as good.

<3. Discoloration Test>

10 g of EPDM rubber pieces were placed per 100 g of the coolant in a screw mouth bottle and the resultant was heated at 160° C. for 24 hours. Thereafter, the color of the liquid was visually observed.

The results are shown in Tables 2-1 and Table 2-2 below.

TABLE 2-1

|  |  | Example 1 | Example 2 | Example 3 | Example 4 | Example 5 | Example 6 | Comparative Example 1 | Comparative Example 2 |
|---|---|---|---|---|---|---|---|---|---|
| Composition |  | LLC | 53 | 53 | 53 | 53 | 53 | 53 | 53 | 53 |
|  |  | Water | 46.45 | 46 | 46.45 | 46 | 46.45 | 46 | 47 | 46.5 |
|  | Viscosity index improver | Polyoxyethylene alkyl ether sulfuric acid ester salt | 0.5 | 0.5 | 0.5 | 0.5 | 0.5 | 0.5 | — | 0.5 |
|  | Rubber swelling inhibitor | Methyl 3,5-dihydroxybenzoate | 0.05 | 0.5 |  |  | 0.025 | 0.25 |  | — |
|  |  | p-methoxyphenol |  |  | 0.05 | 0.5 | 0.025 | 0.25 |  |  |
|  |  | t-butylhydroquinone |  |  |  |  |  |  |  |  |
|  |  | Methyl gallate |  |  |  |  |  |  |  | — |
|  |  | 4-t-butylpyrocatechol |  |  |  |  |  |  |  |  |
|  |  | 3,3'-dithiodipropionic acid |  |  |  |  |  |  |  | — |
| Evaluation | A rate of change in the volume of rubber (H-NBR) of 30% or less is good | | 23 | 6 | 27 | 6 | 23 | 7 | 6 | 63 |
|  | Discoloration test | | No significant discoloration | No significant discoloration | No significant discoloration | No significant discoloration | No significant discoloration | No significant discoloration | No significant discoloration | No significant discoloration |
|  | Kinematic viscosity at 25° C. (mm²/s) | | ≥100 | ≥100 | ≥100 | ≥100 | ≥100 | ≥100 | 3 | ≥100 |

TABLE 2-2

|  |  |  | Comparative Example 3 | Comparative Example 4 | Comparative Example 5 | Comparative Example 6 | Comparative Example 7 | Comparative Example 8 | Comparative Example 9 | Comparative Example 10 | Comparative Example 11 |
|---|---|---|---|---|---|---|---|---|---|---|---|
| Composition |  | LLC | 53 | 53 | 53 | 53 | 53 | 53 | 53 | 53 | 53 |
|  |  | Water | 45.5 | 46.48 | 45.5 | 46.48 | 46 | 46 | 46.45 | 46.4 | 46 |
|  | Viscosity index improver | Polyoxyethylene alkyl ether sulfuric acid ester salt | 0.5 | 0.5 | 0.5 | 0.5 | 0.5 | 0.5 | 0.5 | 0.5 | 0.5 |
|  | Rubber swelling inhibitor | Methyl 3,5-dihydroxybenzoate | 1 | 0.02 |  |  |  |  |  |  |  |
|  |  | p-methoxyphenol |  |  | 1 | 0.02 |  |  |  |  |  |
|  |  | t-butylhydroquinone |  |  |  |  | 0.5 |  |  |  |  |
|  |  | Methyl gallate |  |  |  |  |  | 0.5 | 0.05 |  |  |
|  |  | 4-t-butylpyrocatechol |  |  |  |  |  |  |  | 0.1 |  |
|  |  | 3,3'-dithiodipropionic acid |  |  |  |  |  |  |  |  | 0.5 |
| Evaluation | A rate of change in the volume of rubber (H-NBR) of 30% or less is good | | 5 | 37 | 5 | 34 | 8 | 8 | 25 | 23 | 55 |
|  | Discoloration test | | Blackened | No significant discoloration | Blackened | No significant discoloration | Blackened | Blackened | Blackened | Blackened | No significant discoloration |
|  | Kinematic viscosity at 25° C. (mm²/s) | | ≥100 | ≥100 | ≥100 | ≥100 | ≥100 | ≥100 | ≥100 | ≥100 | ≥100 |

From Tables 2-1 and 2-2, it can be seen that the coolants of Examples 1 to 6 in which the compound (p-methoxyphenol) expressed by the formula (1) and/or the compound (methyl 3,5-dihydroxybenzoate) expressed by the formula (2) was contained in a specific amount had a desired kinematic viscosity and could suppress swelling of rubber and discoloration of the coolant.

The coolant composition of the present invention is suitably used for cooling an internal combustion engine, particularly an automotive engine, an inverter, a battery, and the like.

The invention claimed is:
1. An automotive engine coolant composition comprising:
a sole surfactant as a viscosity index improver;
a rubber swelling inhibitor; and
a base, wherein
the rubber swelling inhibitor is at least one selected from a compound expressed by a formula (1):

(1)

in the formula, $R^1$ is hydrogen, a methyl group, or an ethyl group, and a compound expressed by a formula (2):

(2)

in the formula, $R^2$ is hydrogen, a methyl group, or an ethyl group, the base includes at least water or an alcohol selected from the group consisting of a monohydric alcohol, a dihydric alcohol, a trihydric alcohol, and a glycol monoalkyl ether, a kinematic viscosity is 8.5 mm²/s or more at 25° C., the sole surfactant is an anionic surfactant selected from the group consisting of a polyoxyethylene alkyl ether sulfuric acid ester salt, an alkyl phosphoric acid ester salt, and a polyoxyethylene alkyl ether phosphoric acid ester salt, and a content of the rubber swelling inhibitor is 0.03 parts by mass or more and 0.9 parts by mass or less with respect to 100 parts by mass of the coolant composition.

2. The automotive engine coolant composition according to claim 1, wherein
the automotive engine coolant composition has a kinematic viscosity of 2.0 mm²/s or less at 100° C.

3. The automotive engine coolant composition according to claim 1, wherein
the content of the rubber swelling inhibitor is 0.05 parts by mass or more and 0.5 parts by mass or less with respect to 100 parts by mass of the coolant composition.

4. The automotive engine coolant composition according to claim 1, wherein
a content of the viscosity index improver is 0.005 parts by mass or more and 3 parts by mass or less with respect to 100 parts by mass of the coolant composition.

5. The automotive engine coolant composition according to claim 1, further comprising:
a rust inhibitor.

6. An automotive engine concentrated coolant composition for obtaining the coolant composition according to claim 1, which is diluted 2 to 10 times by mass with a base so as to be used.

7. The automotive engine concentrated coolant composition according to claim 6, wherein
with respect to 100 parts by mass of the concentrated coolant composition, a surfactant as a viscosity index improver: 0.1 to 99 parts by mass; a rubber swelling inhibitor: 0.1 to 5 parts by mass; and a solvent: 0 to 99.8 parts by mass are contained, the solvent being at least water or an alcohol selected from the group consisting of monohydric alcohol, a dihydric alcohol, a trihydric alcohol, and a glycol monoalkyl ether, and the surfactant is an anionic surfactant.

8. The automotive engine coolant composition according to claim 6, wherein
in the formula (2), $R^2$ is the methyl group, or the ethyl group.

9. An internal combustion engine comprising the coolant composition according to claim 1 as a coolant.

10. The automotive engine coolant composition according to claim 1, wherein
the rubber swelling inhibitor is the compound expressed by the formula (2).

* * * * *